United States Patent
Ebner et al.

[11] 3,901,332
[45] Aug. 26, 1975

[54] APPARATUS FOR REMOVING DETRITUS FROM DRILL HOLES

[75] Inventors: Otmar Ebner; Franz Ebner, both of Milan, Italy

[73] Assignee: Gebr. Boehler & Co. Aktiengesellschaft, Vienna, Austria

[22] Filed: Dec. 22, 1972

[21] Appl. No.: 317,722

[30] Foreign Application Priority Data
Dec. 23, 1971 Austria .................... 11063/71

[52] U.S. Cl. ............................................. 175/209
[51] Int. Cl. ........................................... E21b 21/00
[58] Field of Search .......... 175/209, 207, 211, 212, 175/213; 277/166

[56] References Cited
UNITED STATES PATENTS

| | | | |
|---|---|---|---|
| 751,253 | 2/1904 | Brady | 175/209 |
| 1,816,481 | 7/1931 | Hansen | 175/209 X |
| 2,706,495 | 4/1955 | Risley | 277/166 |
| 2,730,333 | 1/1956 | Lenhart, Jr. et al. | 175/209 |
| 2,740,609 | 4/1956 | Richardson et al. | 175/209 |
| 3,417,830 | 12/1968 | Nichols | 175/209 |

*Primary Examiner*—Richard J. Scanlan, Jr.
*Assistant Examiner*—Peter Nerbun

[57] ABSTRACT

Apparatus for removing detritus, e.g. dust and fine particles, from drill holes, particularly from large diameter holes in rock produced by compressed-air-driven drilling tools of the reciprocating, impact type. The apparatus is provided with mechanism located within the drill hole during the drilling operation and mounted to advance axially of the drill hole with the drilling tool, such mechanism collecting pressure air discharged within the drill hole adjacent the bottom thereof which entrains the detritus produced by the drilling tool, the pressure air carrying the detritus to a bell or funnel-shaped member from which it is removed through a hose.

8 Claims, 1 Drawing Figure

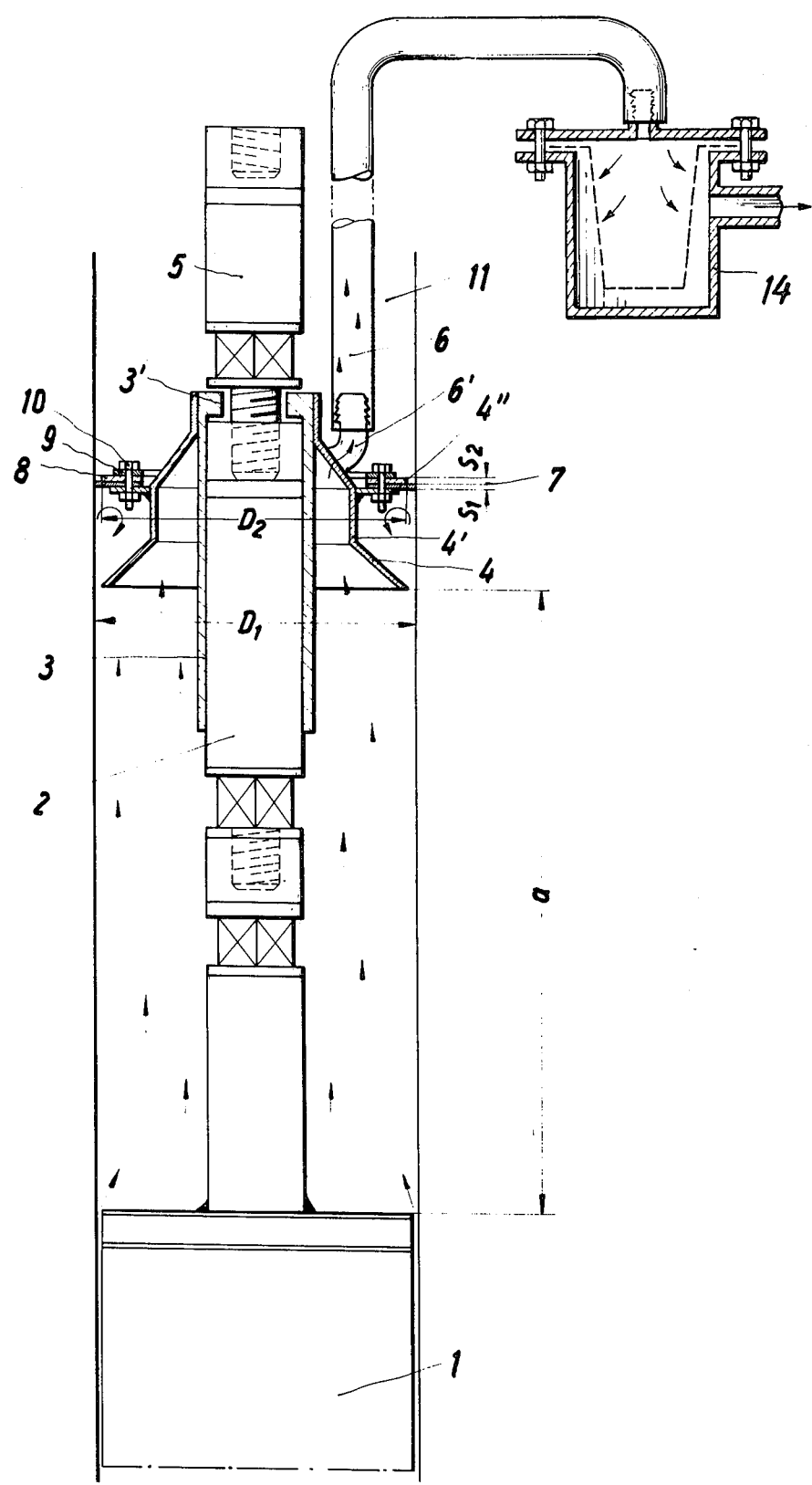

APPARATUS FOR REMOVING DETRITUS FROM DRILL HOLES

This invention relates to apparatus for removing detritus such as dust and fine particles from drill holes, particularly from large diameter holes in rock, such detritus being produced in bores in the rock formed during drilling by drilling tools of the reciprocating, impact type, such as those driven by compressed air.

There is already known stone-boring apparatus of the impact type wherein a pressure lower than atmospheric pressure is maintained within the hollow drill string, so that detritus such as rock dust produced by the boring operation will be sucked through holes in the drilling tool and into the hollow drill string to which the tool is affixed. This system has the disadvantage that it requires a source of reduced pressure or vacuum, and that not all of the dust is sucked out since some of it escapes from the drill hole.

There is also known an apparatus which is used with stone-boring apparatus such as a pressure-air-driven hammer, in which the outer end of the bore hole is provided with a suction head which is fixedly connected thereto by an elastic seal, the inner end of the suction head being connected to a source of reduced pressure. This system has the disadvantage that a source of reduced air pressure must be provided. The further disadvantage is that the system does not provide the desired degree of exhaustion of detritus, such exhaustion being highly uneven; in some cases it may fail altogether, as when crevices occur in the rock, such crevices communicating with the drill hole.

Still further, there is known a similar apparatus for the collection and leading away of dust and the like produced in the boring of stone, such last-named system also being provided with a vacuum head connected by a vacuum seal, the vacuum head leading the stone dust downwardly. Besides the two disadvantages mentioned above in connection with the previous system, there is the further disadvantage that such apparatus is not well-suited for drilling in a vertically downward direction.

Moreover, there is a previous system for the discharge of rock dust in rock-boring machine (of the type in which an impact rod extends from the outer ends of the bore hole); in which a dust-collecting bell is provided inwardly of the bore hole during the drilling operation, such bell being connected by an eccentrically disposed hose for leading away the rock dust. With this apparatus there is the danger that rock dust will escape between the drill rod and the rock dust collecting bell, particularly through the annular space between the rod and the bell, so that in consequence the health of the attending personnel will be threatened, especially in those cases where there is not employed an injector nozzle which is connected to a second hose so as to subject the interior of the rock dust collecting bell to a reduced pressure. A further disadvantage of this apparatus is that the flexible hose projecting into the bore may become wound upon the drill rod and consequently ruptured.

Still another known apparatus for the leading off of rock dust produced by a rock-boring machine employs a bellows or blast engine that is either positioned externally of the bore hole and is connected to a vacuum head, or is connected to a pipe which projects into the drill hole and discharges a mixture of rock dust and air from the bore hole through a hose and a sealing plate forming a dust discharge means. This system also has the disadvantage of requiring a source of energy for driving the bellows or blast engine.

The present invention has among its objects the overcoming of the above-described disadvantages of rock dust discharging systems, and to provide compressed air, discharged near the bottom of the bore, which lifts the rock dust in a simple and fool-proof method without the requirement of a separate source of energy. In accordance with the invention there is provided a rock dust collecting bell, or a plurality of such bells disposed one above the other, which span the space between the drill rod and the drill hole during the drilling operation and is sealed to the bore by an elastic sealing means. The bell is connected to the drill string or rod at a distance which is fixed with respect to the drilling tool, the bell and the sealing means advancing in the bore with the drill rod. Discharge of compressed air which drives the drilling mechanism creates an increased pressure in the space between the bottom of the drill bore and the bell, such space being substantially sealed from the atmosphere. As a consequence, a mixture of air and rock dust, which is formed in such space, rises therein and is led upwardly out of the drill bore through a conduit such as a flexible hose, the rock dust then being separated from the air by suitable means such as a filter.

The invention will be more fully understood upon consideration of the following description and the accompanying drawing, in which:

The single FIGURE is a schematic view, partially in vertical axial section and partially in side elevation, of a preferred embodiment of apparatus in accordance with the invention.

A bore hole 11 in rock is shown as having been formed by a drilling tool (not shown) affixed to the bottom end of a drill rod string 1. The drill rod string 1 is advanced vertically downwardly by means of mechanism (not shown) to which the upper end of the drill rod string 1 is attached through the medium of a threaded nipple 2 and an upper, driving rod 5. Compressed air is fed downwardly through the drill rod string to be discharged at the bottom of the drill hole. A rock dust collecting bell 4 is fixedly connected to a supporting sleeve 3 which is telescoped about the body of the nipple 2 and is held axially fixed with respect thereto by a radially inwardly extending annular flange 3' on the upper end of the sleeve 3, the flange 3' being received within an annular transverse groove formed between the upper end of the threaded nipple 2 and an annular flange near the lower end of the member 5. The bell 4 has lower and upper frusto-conical portions connected by an intermediate circular cylindrical portion 4', a circular cylindrical portion of reduced diameter at the upper end of the bell being telescoped about and fixedly secured to the upper end of the sleeve 3. It will thus be apparent that the lower edge of the bell 4 is located a constant distance a from the upper end of the drill rod string 1.

Secured to the upper end of the circular cylindrical portion 4' of the bell 4 is an annular flange 4" which is disposed in a plane transverse to the axis of the drill rod string. A first annular sealing means 7 made of elastomeric material such as rubber is disposed upon the flange 4", sealing means 7 extending outwardly to sealing engagement with the wall of the bore hole 11. Overlying the sealing means 7 is a second elastomeric annular sealing means 8 having a diameter somewhat less than that of sealing means 7. As shown, the thickness $S_2$ of the sealing member 8 somewhat exceeds the thickness $S_1$ of the sealing means 7. Means 8 serves to back up the sealing means 7 as it yields locally during reciprocation of the bell 4 and the sealing means carried thereby. The sealing means 7 and 8 are fixedly secured to the flange 4" by a series of vertically disposed machine bolts 10 which are securely held in place by lock washers 9.

It will be apparent that due to the discharge of compressed air at the location of the drilling tool at the bottom of the drill rod string and due to the sealing means 7, 8 there is created an increased pressure in the space below the sealing means and the bottom of the bore hole 11. Consequently, the mixture of air and rock dust, formed by the action of the drilling tool and drill rod string, is forced upwardly under increased pressure by such interaction of the sealing means 7, 8 and the wall of the bore hole 11. The mixture of air and dust is thus forced by increased pressure upwardly of the bore hole 11 and is caught within the bell 4, such rock dust-air mixture flowing out of the valve through a flexible conduit or hose 6 connected to a fitting 6' disposed eccentrically on the bell. The hose 6 may be provided beyond the upper end of the bore hole 11 with a conventional air filter 14, which may include, for example, a porous bag. It will be apparent that the bell 4 is held from rotation during the drilling operation, as for example, by the hose 6 and the eccentrically mounted fitting 6'.

The apparatus of the invention removes even the finest rock dust from the bore in a safe and sure manner. The apparatus operates satisfactorily no matter what the length of the drill rod string may be. The flexible hose 6 cannot become wound about the member 5 during operation of the apparatus since the engagement between the sealing means 7, 8 in the wall of the bore 11, as well as the eccentric mounting of the fitting 6' and of the hose 6 connected thereto.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is;

1. In an axially impacting boring mechanism for forming large bores in stone, an improved mechanism for removing boring detritus from the bore during the operation of the boring apparatus, comprising a boring tool affixed to the forward end of a drill rod string;

pneumatic means operatively connected to a rearward end of the drill rod string for advancing it into said bore;

means operatively connected to the drill string for discharging compressed air into the bore adjacent the bottom thereof;

a bell member having an opening facing the bottom of the bore hole for receiving detritus, said bell member further having a. a cylindrical side surface on which a stressed resilient circular sealing plate is mounted, and b. a tapered portion above said cylindrical side surface tapering inwardly away from said side surface to which the drill rod string is rotatably movably and axially non-movably mounted, and to which a flexible hose is secured for removing detritus received by said bell member; said plate sealingly engaging the wall of the drill bore, and spanning the entire opening between the wall of such bore and the drill rod string for trapping the compressed air introduced by said discharging means between the bottom of the bore hole and the plane of said sealing plate so that said trapped compressed air, acting alone, is effective to propel the detritus from the bottom of the bore into the opening of the bell member, said sealing plate further being effective to prevent the escape of any upwardly propelled detritus that is not received in the opening of the bell.

2. Apparatus according to claim 1 wherein the sealing means has the portion thereof engaging the wall of the drill bore made of elastomeric material and is of annular shape.

3. Apparatus according to claim 2, wherein the sealing means includes a second, back-up annular member made of elastomeric material, such second member being disposed coaxially of the first sealing member and being of smaller diameter than the first sealing member.

4. Apparatus according to claim 3, wherein the second sealing member has a thickness which is greater than the thickness of the first sealing member.

5. Apparatus according to claim 4, comprising an annular outwardly directed flange on the bell toward its axially outer end, and means securing the first and second annular sealing members to said flange on the bell.

6. Apparatus according to claim 1, wherein the distance between the bell and the axially outer end of the drill rod string is constant.

7. Apparatus according to claim 1, wherein there is interposed between the drill rod driving means and the drill rod string a threaded nipple, the drill rod driving means and the threaded nipple presenting an annular groove therebetween, and a sleeve having a radially inwardly directed flange thereon received in the annular groove, the bell being supported on such sleeve.

8. Apparatus according to claim 1, comprising a dust-filtering means connected to the hose leading from the bell whereby to separate detritus from the detritus-air mixture delivered thereto.

* * * * *